United States Patent
Murakami et al.

(10) Patent No.: US 6,799,362 B2
(45) Date of Patent: Oct. 5, 2004

(54) MOTOR AND METHOD FOR MANUFACTURING THE SAME

(75) Inventors: Hiroshi Murakami, Suita (JP); Hisakazu Kataoka, Takefu (JP); Osaaki Morino, Takefu (JP); Yoshinari Asano, Takefu (JP); Toshiyuki Tamamura, Kusatsu (JP); Haruhiko Kado, Moriyama (JP); Akihiko Yamazaki, Takefu (JP); Yukio Honda, Katano (JP)

(73) Assignee: Matsushita Electric Industrial Co., Ltd.

( * ) Notice: Subject to any disclaimer, the term of this patent is extended or adjusted under 35 U.S.C. 154(b) by 0 days.

(21) Appl. No.: 10/378,500

(22) Filed: Mar. 3, 2003

(65) Prior Publication Data

US 2003/0230948 A1 Dec. 18, 2003

Related U.S. Application Data

(63) Continuation of application No. PCT/JP01/07594, filed on Sep. 3, 2001.

(51) Int. Cl.[7] .............................................. H02K 15/16
(52) U.S. Cl. ........................... 29/598; 29/607; 29/732; 29/604; 310/216; 310/154.4; 310/156.74
(58) Field of Search .................... 29/596, 598, 597, 29/732, 606, 607, 609, 605, 604, 738; 310/216, 154.4, 156.74, 156.79, 179, 217

(56) References Cited

U.S. PATENT DOCUMENTS

| | | | | |
|---|---|---|---|---|
| 3,831,268 A | * | 8/1974 | Boyd et al. ................ | 29/598 |
| 5,463,262 A | * | 10/1995 | Uchida .................... | 310/156.61 |
| 6,047,460 A | * | 4/2000 | Nagate et al. ............. | 29/598 |
| 6,226,857 B1 | * | 5/2001 | Becherucci ............... | 29/598 |
| 6,601,287 B2 | * | 8/2003 | Pop, Sr. .................. | 29/596 |
| 2002/0190600 A1 | * | 12/2002 | Hong et al. .............. | 310/254 |

FOREIGN PATENT DOCUMENTS

| | | |
|---|---|---|
| EP | 0 926 801 A2 | 6/1999 |
| JP | 11-41886 A | 2/1999 |
| JP | 11-234931 A | 8/1999 |
| JP | 11-275787 A | 10/1999 |
| JP | 11-308792 A | 11/1999 |
| JP | 11-332282 A | 11/1999 |
| JP | 11-341752 A | 12/1999 |
| JP | 2000-116080 A | 4/2000 |

* cited by examiner

Primary Examiner—David P. Bryant
Assistant Examiner—Stephen Kenny
(74) Attorney, Agent, or Firm—Rossi & Associates

(57) ABSTRACT

A motor and a method for manufacturing thereof use a rotor having permanent magnets and stators. The highest revolving speed of a motor is adjusted by using end plates of different thickness. The end plates are made of a magnetic material and disposed at the end faces of the rotor. The end plates made of a magnetic material provide part of the magnetic flux generated from the permanent magnets with short circuits within the inside of the rotor. The magnetic flux that links with the coil can be adjusted by using end plates of different thickness. Therefore, the highest revolving speed of a motor can be finely adjusted with ease.

9 Claims, 5 Drawing Sheets

MOTOR AND METHOD FOR MANUFACTURING THE SAME

This is a continuation of International Application PCT/JP01/07594 having an international filing date of Sep. 03, 2001; this International Application was not published in English, but in Japanese as WO 02/19499.

BACKGROUND

FIG. 8 shows a conventional structure of a rotor of a synchronous motor. The rotor of the conventional permanent magnet synchronous motor comprises rotor core sheets 71 laminated in the direction of and axis of rotor 70, permanent magnets 73 having substantially the same shape and same thickness as the slits 72 formed inside the rotor core thus laminated. Both ends of the laminated body have end plates 76 made of nonmagnetic metal, such as brass, stainless steel, or the like. All these components are assembled and fixed into a single piece body by caulking pins (not shown) piercing through caulk pin holes 75.

The synchronous motors have been driven on a power supply of 100V or 200V AC. Recently, however, some are driven on a low DC voltage, 50V or lower, for use in a car or the like apparatus. Such applications are increasing as a result of development in battery technology. Conventionally, when it has been driven on a 100V or 200V AC power supply, the motor coils are wound for some sixteen turns, seventeen turns, or more turns; in some motors they even exceed 100 turns.

The highest revolving speed of a motor has been controlled mostly by designing different number of turns with the coil. For example, when modifying a motor having 50-turn coil and the highest revolving speed of 9000 rpm to a motor having 10000 rpm highest revolving speed, the 50 turns are reduced to 45 turns. Since the highest revolving speed and the number of turns are roughly proportionate to each other, it is possible to adjust the speed by reducing the number of turns by 5 turns, in the above example.

However, in a motor driven on a low power supply voltage of 50V or lower, winding of the coil normally counts a mere several turns. Therefore, if a 50V motor having 5-turn coil and revolving at 9000 rpm, highest speed is reduced in the number of turns by 1 turn to 4 turns, the highest revolving speed can increase to reach a 11000 rpm or even higher. Thus, change in the number of turns by only 1 results in too much change in the revolving speed. Therefore, it is difficult to adjust precisely the highest revolving speed by means of the number of turns.

Thus, there is a need for a way to more precisely control revolving speed. The present invention addresses the above problem, and aims to offer an easy method of adjusting the highest revolving speed with the low voltage motors.

SUMMARY OF THE INVENTION

The present invention relates to a permanent magnet synchronous motor driven on a low DC voltage, and a method of its manufacture.

One aspect of the present invention is a low voltage DC motor having rotor, a stator or stator iron core, and a coil portion. The rotor has a permanent magnet. The stator iron core can have a plurality of tooth sections. The coil portion is wound around respective teeth no more than 10 turns.

In one embodiment, the motor has an end plate made of a magnetic material disposed at an end face or axial end of the rotor. The end plate can be a laminated body formed of thin sheets of a magnetic material, or a single magnetic steel sheet. In another embodiment, the rotor is fitted with a permanent magnet inserted in a slit formed therein and a magnetic substance is fitted in the slit, in addition to the permanent magnet. In another embodiment, a balance weight of a magnetic material can be disposed at an end face of the rotor or at an end plate (can be magnetic or non-magnetic material). In another embodiment, the length of the rotor in the axis direction is made shorter than that of the stator iron core. In another embodiment, the length of the permanent magnet in the axis direction is made shorter than that of rotor. In another embodiment, a magnetizing current applied at magnetization of the rotor is controlled. All of these features can be used to control the highest revolving speed of the motor. At least each of these features can constitute means for controlling the highest revolving speed of the motor.

Another aspect of the present invention is a method of manufacturing a motor, such as the motor described above. The highest revolving speed of the motor can be adjusted by disposing the end plate and/or the balance weight at the end face or axial end of the rotor and changing the thickness of the end plate or the size of the balance weight. Alternatively, the same can be achieved with the magnetic substance inserted into the slit formed in the rotor, or choosing the rotor length to be shorter than the stator length, or choosing the permanent magnetic length to be shorter than the rotor length, or controlling the magnetizing current applied at magnetization of the rotor.

DETAILED DESCRIPTION

Some of the embodiments of the present invention are described in reference to the drawings. The embodiments are just exemplary. Thus, it is to be understood that they should not limit the technical scope of the invention.

Figure 1:
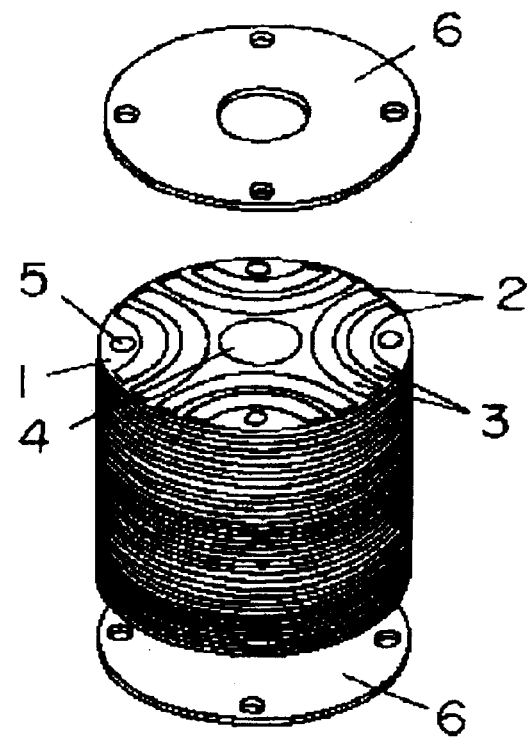
FIG. 1 shows a rotor structure of permanent magnet synchronous motor in accordance with a first exemplary embodiment of the present invention.

FIG. 1 shows a first exemplary embodiment of the present invention. Rotor core sheets 1 are made of magnetic steel sheets, and slits 2 are formed in the inside of the rotor. Permanent magnets 3, formed in approximately the same shape as the slits, are fitted in the inside of the slits 2. A through hole 4 is provided for a motor shaft, and caulk pin holes 5 are provided for insertion of a caulking pins to fix the rotor core sheets laminated in the axis direction together. End plates 6, however, are made of iron or other magnetic material.

The rotor shown in FIG. 1 is assembled by laminating the rotor core sheets 1 in the direction of rotor axis (vertical, in the drawing), and then permanent magnets having approximately the same shape and the same thickness as the slits are inserted to the slits 2, end plates 6 made of a magnetic material are disposed at both end-faces, and caulking pins are inserted through the caulk pin holes 5 for fixing.

Figure 2A:
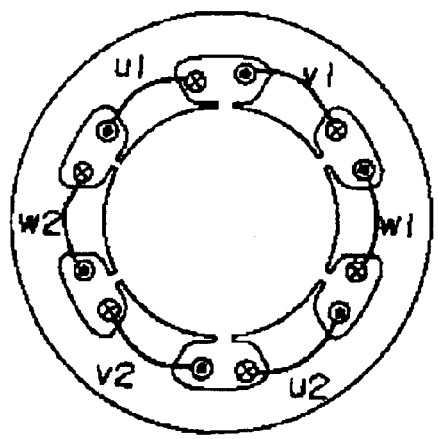
FIGS. 2A and 2B show a stator structure of permanent magnet synchronous motor in accordance with a first exemplary embodiment of the present invention.
Figure 2B:
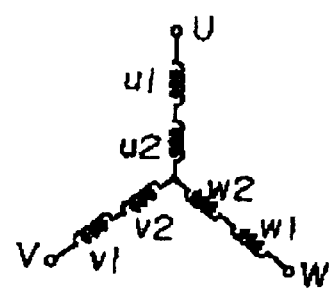

A stator comprises, as shown in FIG. 2A, stator iron cores and coil portions formed of coils wound around teeth of the stator iron cores. The coil portions are made through a concentrated winding method, where each of the teeth is wound around. FIG. 2B shows the coil connection. The motor in the present example is a low voltage DC synchronous motor, driven on a power supply of 50V or lower. Number of the coiling turns around the teeth is 10 turns or less.

A feature of the present invention is in the end plate 6, which is made of a magnetic material, provided at either or both ends of the rotor. Under this structure, the magnetic flux from the permanent magnets 2 emerging out of the outer circumferential surface of rotor does not go outside the rotor, but the magnetic flux forms a short-circuit loop where it returns to the reverse side of magnets 2 via the end plates 6 made of a magnetic material. Thus, it can make the flux linkage of permanent magnet smaller. By using end plates 6 of different thickness, the short-circuiting magnetic flux can be adjusted to any optional amount, so that the highest revolving speed can be finely-adjusted easily even in the case of a low voltage motor.

For example, when modifying a motor of 8-turn, revolving at 10000 rpm highest speed into that of 9000 rpm, the highest revolving speed can be lowered by using magnetic material for the end plates 6. Further, by increasing the thickness of plates 6, the highest revolving speed can be lowered to be less than 9000 rpm. Thus, a motor of different highest revolving speed can be implemented with the same stator, by using magnetic end plates 6 having a different thickness. Furthermore, by using end plates of a different thickness, the same stator can implement different motors having respective highest revolving speeds of their own.

In the drawing, the end plates 6 made of a magnetic material are provided at both ends of a rotor; however, similar effect is generated when an end plate of a magnetic material is disposed only at one end while using a non-magnetic material at the other end.

Figure 3:
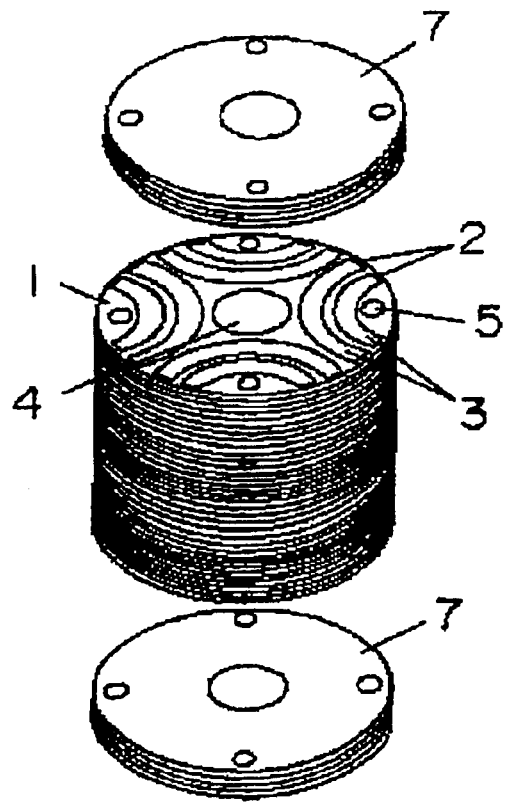
FIG. 3 shows a rotor structure of permanent magnet synchronous motor in accordance with a second exemplary embodiment of the present invention.

FIG. 3 shows a second exemplary embodiment of the present invention. The rotor core can have the same construction as that of the first exemplary embodiment. The second embodiment is different from the first embodiment in that the end plates 7 are formed of laminated sheets of a magnetic material. Use of the sheets of a magnetic material for the end plates generates similar effects as those in the embodiment 1; furthermore, it implements a motor of higher efficiency since the sheets incur a smaller loss due to eddy current at the end plates. When magnetic steel sheets are used for the end plates, the loss of motor can be further reduced.

Figure 4:
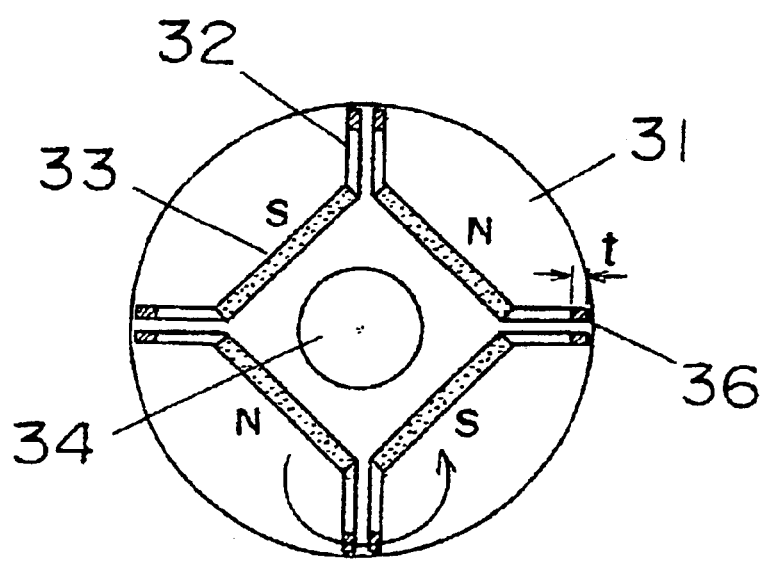
FIG. 4 shows a rotor structure of permanent magnet synchronous motor in accordance with a third exemplary embodiment of the present invention.

FIG. 4 shows a third exemplary embodiment of the present invention, which is a rotor core sheet 31 made of a magnetic steel sheet. The sheet 31 has slits 32 formed in the inside of the rotor. Permanent magnets 33 are inserted into the slits. A through hole 34 is provided for a motor shaft. Magnetic substances 36 formed of iron, etc., can be inserted into the slits. By the magnetic substances inserted in the slits of rotor, as shown in FIG. 4, short-circuit loops can be formed for the magnetic flux. By adjusting the thickness "t" of the magnetic substances, quantity of the magnetic flux making linkage with coils can be changed. The highest revolving speed of a motor can be finely-adjusted by controlling the thickness "t" of magnetic substances. Although the magnetic substances are located at a place within the slits closest to the outer circumference of the rotor in the drawing, disposition in other place within the slits can also brings about similar effects.

Figure 5:
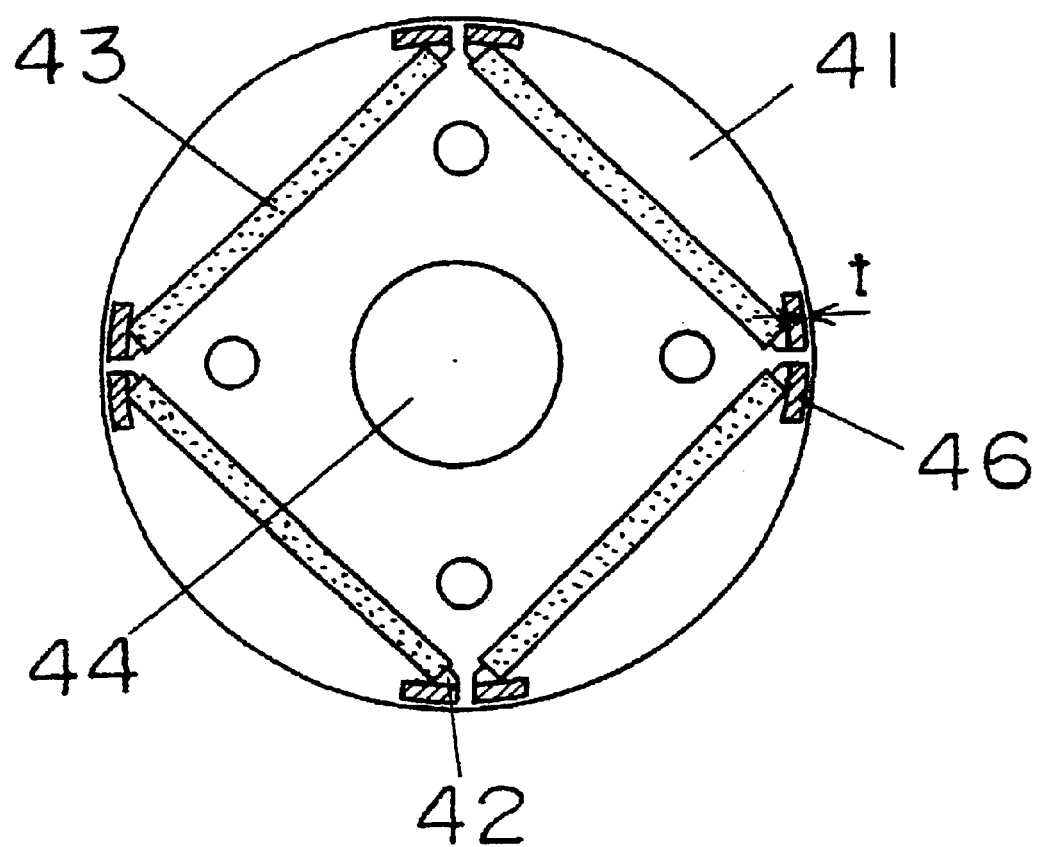
FIG. 5 shows a rotor structure of permanent magnet synchronous motor in accordance with a fourth exemplary embodiment of the present invention.

FIG. 5 shows a fourth exemplary embodiment of the present invention, which is also a rotor core sheet 41 made of a magnetic steel sheet. Slits 42 are formed in the inside of the rotor. Permanent magnets 43 are inserted in the inside of the slits. A through hole 44 is provided for a motor shaft. Magnetic substances 46 formed of iron, etc., can be inserted into the slits. A rotor structured as illustrated in FIG. 5 also generates similar effects as that illustrated in FIG. 4. The same effects as in the first embodiment can be generated by controlling width "t" between the slit 42 and the outer circumference of the rotor core sheet 41.

Figure 6A:
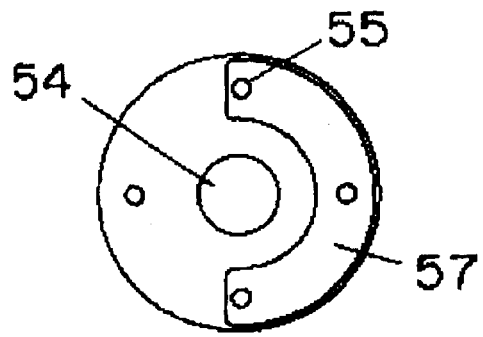
FIGS. 6A and 6B show a rotor structure of permanent magnet synchronous motor in accordance with a fifth exemplary embodiment of the present invention.
Figure 6B:
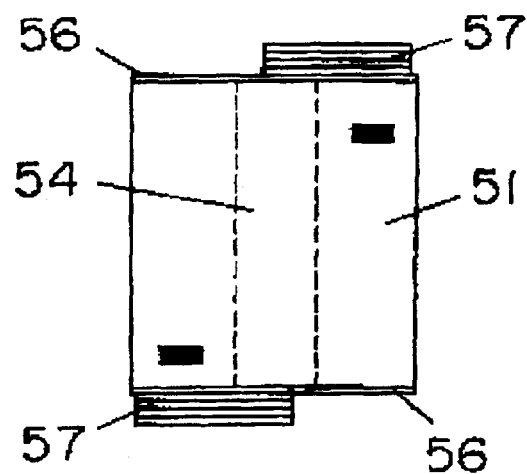

FIGS. 6A and 6B show a fifth exemplary embodiment of the present invention, which embodiment illustrates a rotor core 51 formed of laminated magnetic steel sheets. End plates 56 are disposed at both ends. Balance weights 57 made of a magnetic material are attached or integrally formed with the end plates 56. Caulking pins 55 fix these components together into a single unit. Specifically this embodiment illustrates a rotor of motor that can be used for driving a compressor or the like. The balance weights can be provided at both ends or only at one end, along the direction of rotor axis. The balance weight can be made of a non-magnetic material, such as brass, stainless steel, or the like. However, when it is made of a magnetic material in accordance with the present invention, it provides a short-circuit loop within rotor. Thus, it can control the magnetic flux in the amount of making linkage with coil, and the highest revolving speed of a motor can be finely-adjusted by using a magnetic balance weight.

Figure 7:
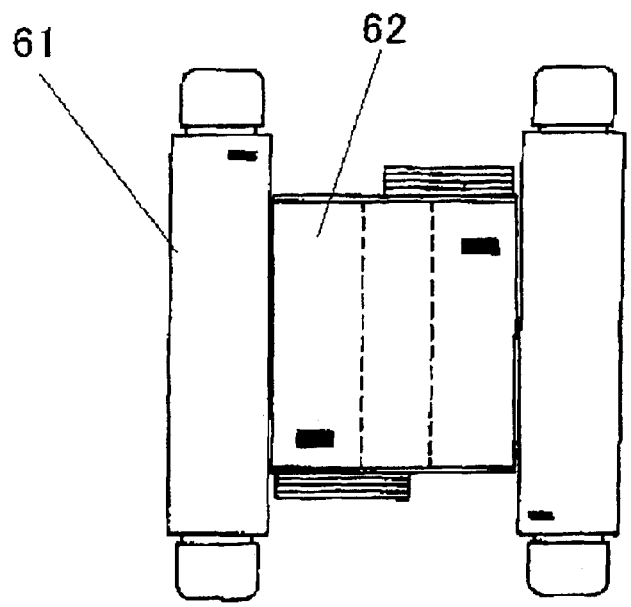
FIG. 7 shows a rotor structure of permanent magnet synchronous motor in accordance with a sixth exemplary embodiment of the present invention.
Figure 8:
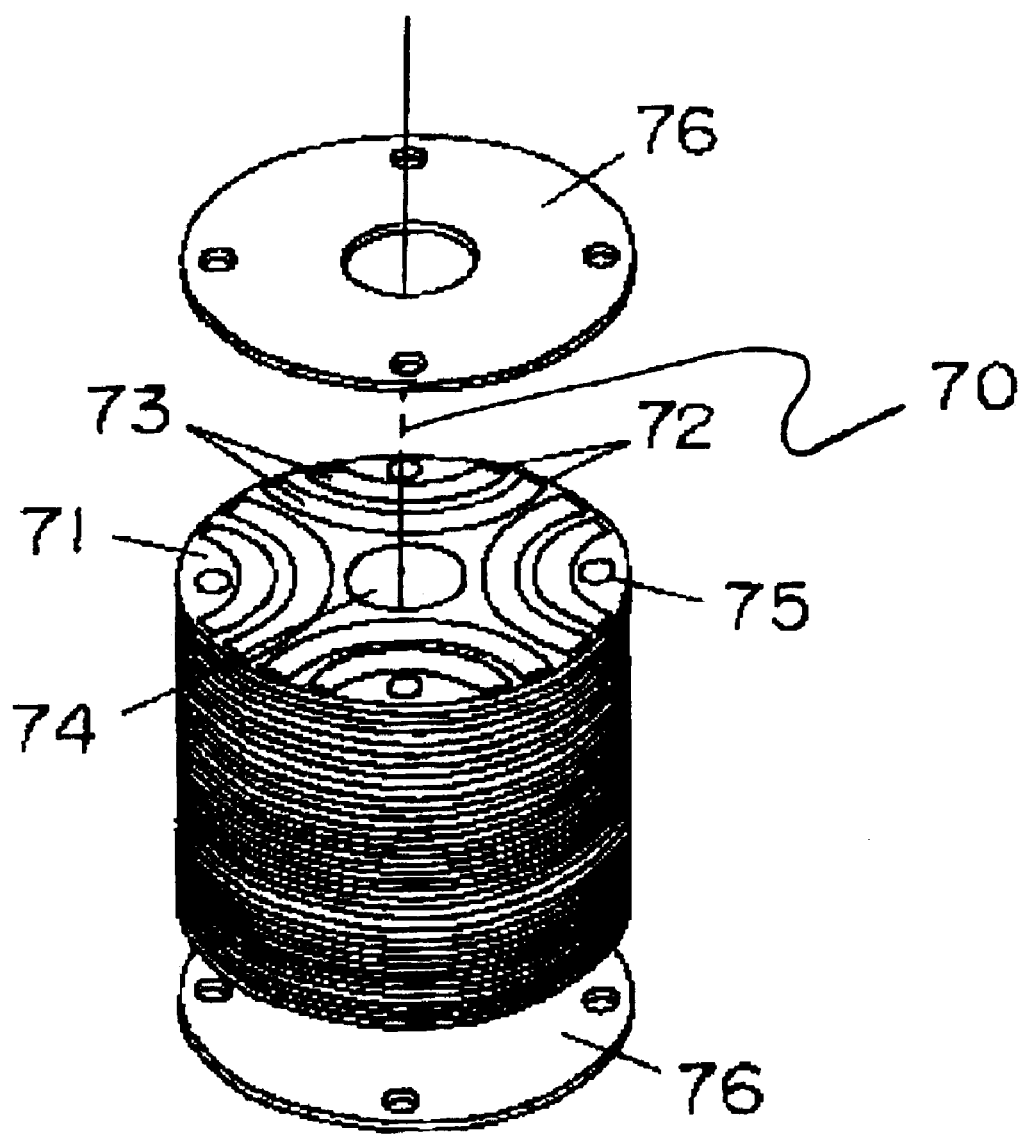
FIG. 8 shows a conventional rotor structure of permanent magnet synchronous motor.

FIG. 7 shows a sixth exemplary embodiment of the present invention. The amount of magnetic flux that makes linkage with the coil can be adjusted by changing the laminated thickness of the rotor, as well as the length of permanent magnets in the axis direction. This effect can be implemented by making the laminated thickness of a rotor core 62 shorter than that of a stator core 61, or by making the length in the axis direction of permanent magnets inserted in the inside of rotor shorter than the laminated thickness of the rotor.

As a seventh exemplary embodiment of the present invention, quantity of the magnetic flux coming from magnets can be changed by controlling a magnetization current applied when magnetizing magnets fitted in the inside of the rotor.

In a permanent magnet synchronous motor driven by a low DC voltage, a rotor in the present invention employs end plates made of a magnetic material at both ends in the axis direction. The magnetic flux coming from permanent magnets can be short-circuited in part within the rotor by the end plates. Therefore, the magnetic flux that makes linkage with coils can be adjusted precisely by using end plates of different thickness. Thus, the present invention offers a permanent magnet synchronous motor, with which the highest revolving speed can be adjusted precisely with ease.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosures of the priority applications, JP 2002-264984 and PCT/JP01/07594, in their entirety, including the drawings, claims, and the specification thereof, is incorporated herein by reference.

We claim:

1. A method for manufacturing a motor comprising a rotor having a permanent magnet and a stator, said method comprising the steps of:

providing at least one end plate formed of a magnetic material;

disposing the end plate at one of end faces of said rotor; and adjusting the highest revolving speed of the motor by adjusting the thickness of the end plate to control the amount of flux escaping from an outer circumferential surface of the rotor with the end plate, which short circuits the magnetic flux.

2. The manufacturing method of claim 1, wherein said end plate is a laminated body formed of thin sheets of a magnetic material.

3. The manufacturing method of claim 1, wherein said end plate is made of a magnetic steel sheet.

4. The manufacturing method of claim 1, further comprising the step of providing a balance weight of a magnetic material at an end face of said rotor, wherein the highest revolving speed of time motor is adjustable by adjusting the size of the balance weight.

5. The manufacturing method according to claim 1, wherein a coil portion of said stator is formed by winding around respective teeth of said stator for at most 10 turns.

6. The manufacturing method according to claim 1, wherein the motor is a low voltage DC motor.

7. A method for manufacturing a motor comprising a rotor having a permanent magnet and a stator, said method comprising the steps of:

providing a balance weight of a magnetic material;

disposing the balance weight at an axial end-part of the rotor; and adjusting the highest revolving speed of motor by adjusting the size of the balance weight to control the amount of flux escaping from an outer circumferential surface of the rotor with the balance weight which short circuits the magnetic flux.

8. The manufacturing method according to claim 7, wherein a coil portion of said stator is formed by winding around respective teeth of said stator for at most 10 turns.

9. The manufacturing method according to claim 7, wherein the motor is a low voltage DC motor.

* * * * *